(12) United States Patent
Yamaguchi et al.

(10) Patent No.: US 9,805,220 B2
(45) Date of Patent: Oct. 31, 2017

(54) ELECTRONIC APPARATUS AND CONTROL METHOD THEREOF

(71) Applicant: Kabushiki Kaisha Toshiba, Minato-ku, Tokyo (JP)

(72) Inventors: Tatsuo Yamaguchi, Tokyo (JP); Yuki Kanbe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 225 days.

(21) Appl. No.: 14/718,389

(22) Filed: May 21, 2015

(65) Prior Publication Data
US 2015/0347778 A1 Dec. 3, 2015

(30) Foreign Application Priority Data
May 30, 2014 (JP) ................................. 2014-113221

(51) Int. Cl.
*G06F 21/62* (2013.01)
*G06F 21/31* (2013.01)
*G06F 21/72* (2013.01)
*H04L 29/06* (2006.01)

(52) U.S. Cl.
CPC .......... *G06F 21/725* (2013.01); *H04L 63/108* (2013.01); *G06F 2221/2137* (2013.01)

(58) Field of Classification Search
CPC ... H04L 63/108; H04L 63/101; G06F 21/725; G06F 21/6218; G06F 21/31
USPC .................................. 726/16–17, 21, 26–27
See application file for complete search history.

(56) References Cited

U.S. PATENT DOCUMENTS

| | | | | |
|---|---|---|---|---|
| 2002/0194500 A1* | 12/2002 | Bajikar | ................. | H04L 63/102 726/35 |
| 2005/0160272 A1* | 7/2005 | Teppler | .................... | H04L 9/12 713/178 |
| 2006/0248596 A1* | 11/2006 | Jain | ......................... | G06F 21/10 726/27 |
| 2011/0130120 A1* | 6/2011 | Hoeksel | ................. | G06F 21/34 455/411 |

(Continued)

FOREIGN PATENT DOCUMENTS

| | | |
|---|---|---|
| JP | 2004-199466 A | 7/2004 |
| JP | 2006-119768 A | 5/2006 |

(Continued)

OTHER PUBLICATIONS

Landon P. Cox et al, Samsara: Honor Among Thieves in Peer-to-Peer Storage, ACM, 2003.*

*Primary Examiner* — Shanto M Abedin
(74) *Attorney, Agent, or Firm* — Knobbe, Martens, Olson & Bear LLP

(57) ABSTRACT

According to one embodiment, an electronic apparatus includes a processor configured to operate based on a clock, the processor includes a register in which a value added in accordance with the clock is stored, and a memory configured to store first period information indicating a first period in which a file is accessible. The processor is configured to acquire first time and date information indicating a first time and date from an external device, calculate a second time and date indicating a present time and date based on the first time and date information and the value, and restrict access to a resource of the electronic apparatus, when the second time and date does not correspond to the first period.

8 Claims, 6 Drawing Sheets

(56) References Cited

U.S. PATENT DOCUMENTS

| | | | |
|---|---|---|---|
| 2012/0260023 A1 | 10/2012 | Nagai et al. | |
| 2013/0111610 A1* | 5/2013 | Bestmann | G06F 21/6245 |
| | | | 726/30 |
| 2015/0326583 A1* | 11/2015 | Kouno | G06F 21/6218 |
| | | | 726/28 |

FOREIGN PATENT DOCUMENTS

| | | |
|---|---|---|
| JP | 2012-178065 A | 9/2012 |
| JP | 2012-221257 A | 11/2012 |

* cited by examiner

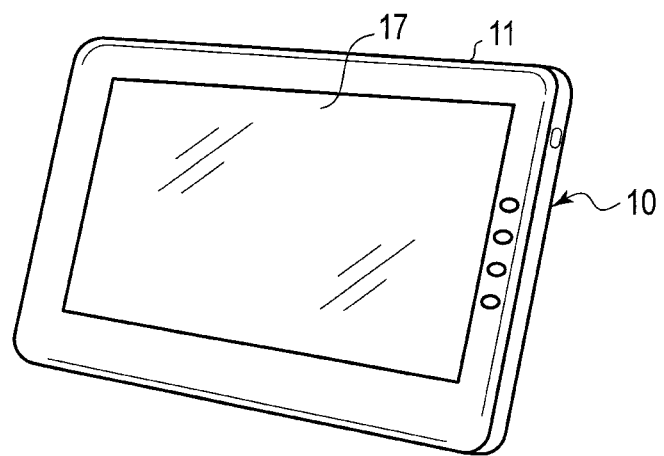
F I G. 1

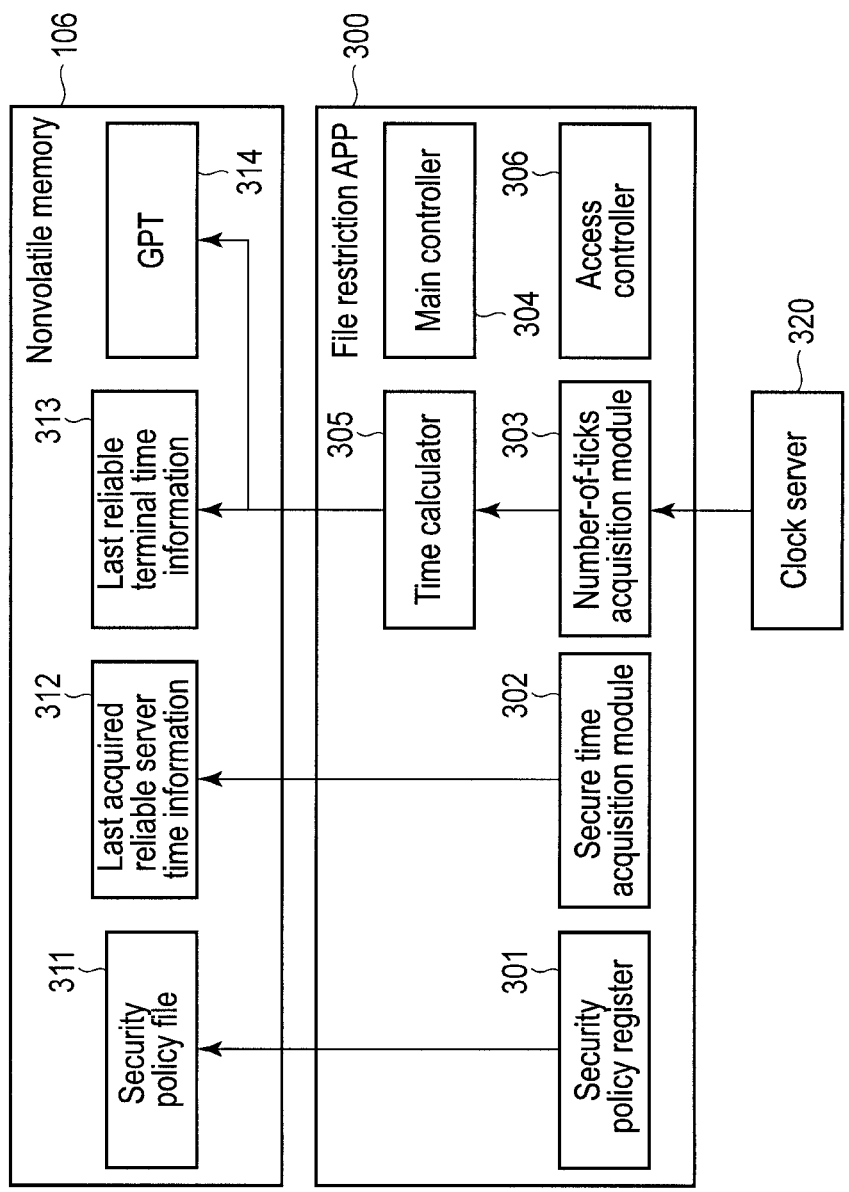
F I G. 3

| Path | Registration time | Available period from when LKGSC is acquired | Process done when available period is exceeded | Available period in grace period | Process done when available period is exceeded | Process after grace period |
|---|---|---|---|---|---|---|
| | | | | | | |
| | | | | | | |

FIG. 4

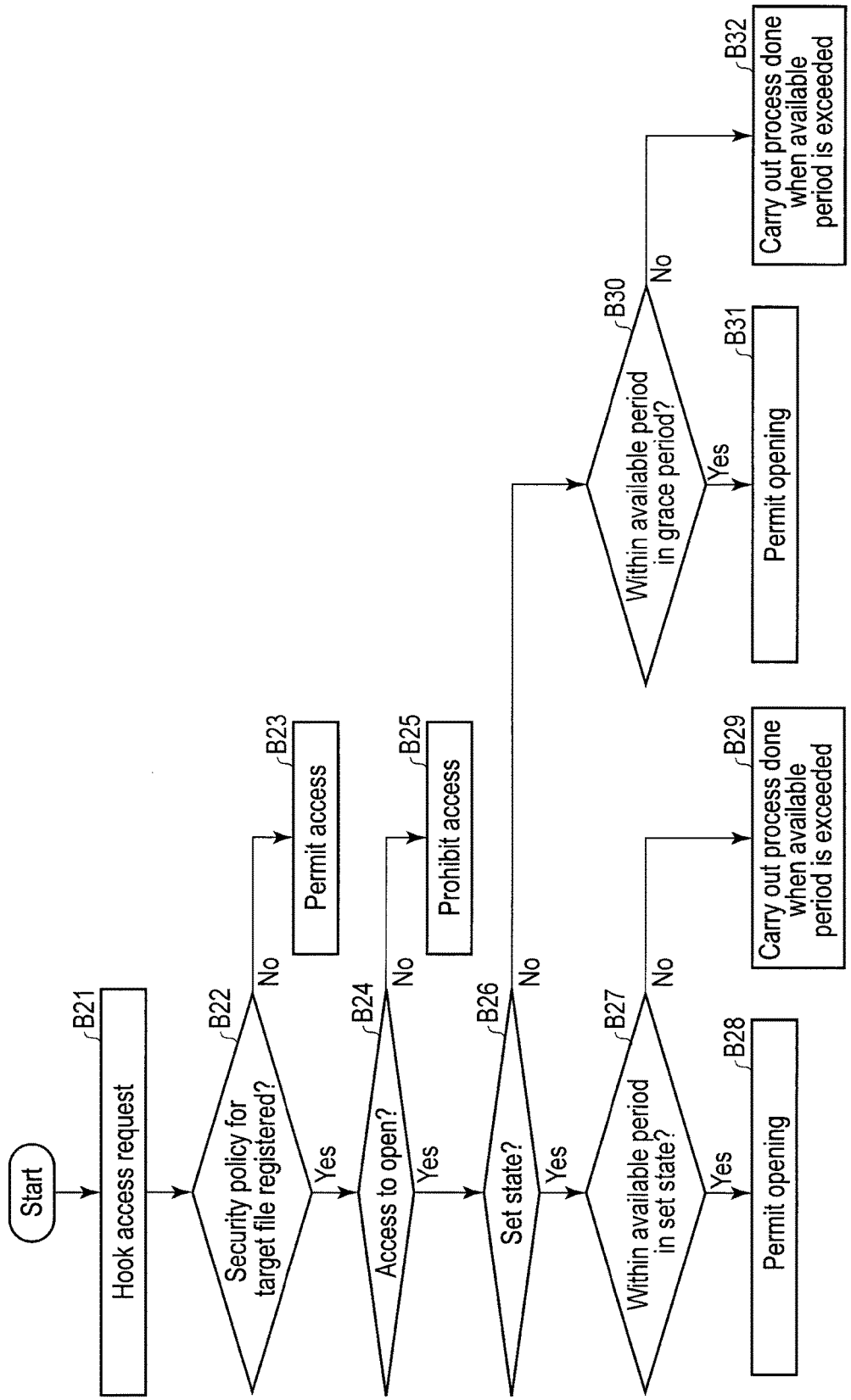
F I G. 6

ELECTRONIC APPARATUS AND CONTROL METHOD THEREOF

CROSS-REFERENCE TO RELATED APPLICATIONS

This application is based upon and claims the benefit of priority from Japanese Patent Application No. 2014-113221, filed May 30, 2014, the entire contents of which are incorporated herein by reference.

FIELD

Embodiments described herein relate generally to an electronic apparatus and a control method thereof.

BACKGROUND

Portable, mobile computers such as slate computers have been used in business. The mobile computers are likely to be lost or stolen. Some of the mobile computers, therefore, have a function of deleting data in a terminal by remote control when it is lost or stolen (hereinafter, referred to as a remote wipe).

A remote wipe performed when a mobile computer is lost or stolen has a problem that the probability of success is low for such a reason that the computer is not connected to a network, and whether or not the remote wipe has succeeded cannot be determined.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a diagram showing an example of an outside of an electronic apparatus of an embodiment;

FIG. 3 is a block diagram showing an example of a functional configuration of a file restriction application;

FIG. 4 is a diagram showing an example of a structure of a security policy file;

FIG. 6 is a flowchart showing an example of a processing procedure of an access controller when a file is accessed.

DETAILED DESCRIPTION

Various embodiments will be described hereinafter with reference to the accompanying drawings.

In general, according to one embodiment, an electronic apparatus includes a processor configured to operate based on a clock, the processor comprising a register in which a value added in accordance with the clock is stored; and a memory configured to store first period information indicating a first period in which a file is accessible. The processor is configured to acquire first time and date information indicating a first time and date from an external device; calculate a second time and date indicating a present time and date based on the first time and date information and the value; and restrict access to a resource of the electronic apparatus, when the second time and date does not correspond to the first period.

A structure of an electronic apparatus of a present embodiment will be described first with reference to FIG. 1. The electronic apparatus can be implemented as a portable terminal, for example, a tablet personal computer, a laptop or notebook personal computer, or a PDA. In the following description, it is assumed that the electronic apparatus is implemented as a tablet personal computer 10 (hereinafter, referred to as the computer 10).

FIG. 1 is a diagram showing an outside of the computer 10. The computer 10 includes a computer main body 11 and a touchscreen display 17. The computer main body 11 includes a housing in the shape of a thin box. The touchscreen display 17 is disposed on a surface of the computer main body 11. The touchscreen display 17 includes a flat panel display (for example, a liquid crystal display [LCD]) and a touchpanel. The touchpanel is provided to cover a screen of the LCD. The touchpanel is configured to detect a position on the touchscreen display 17 which a user's finger or a stylus touches.

Figure 2:
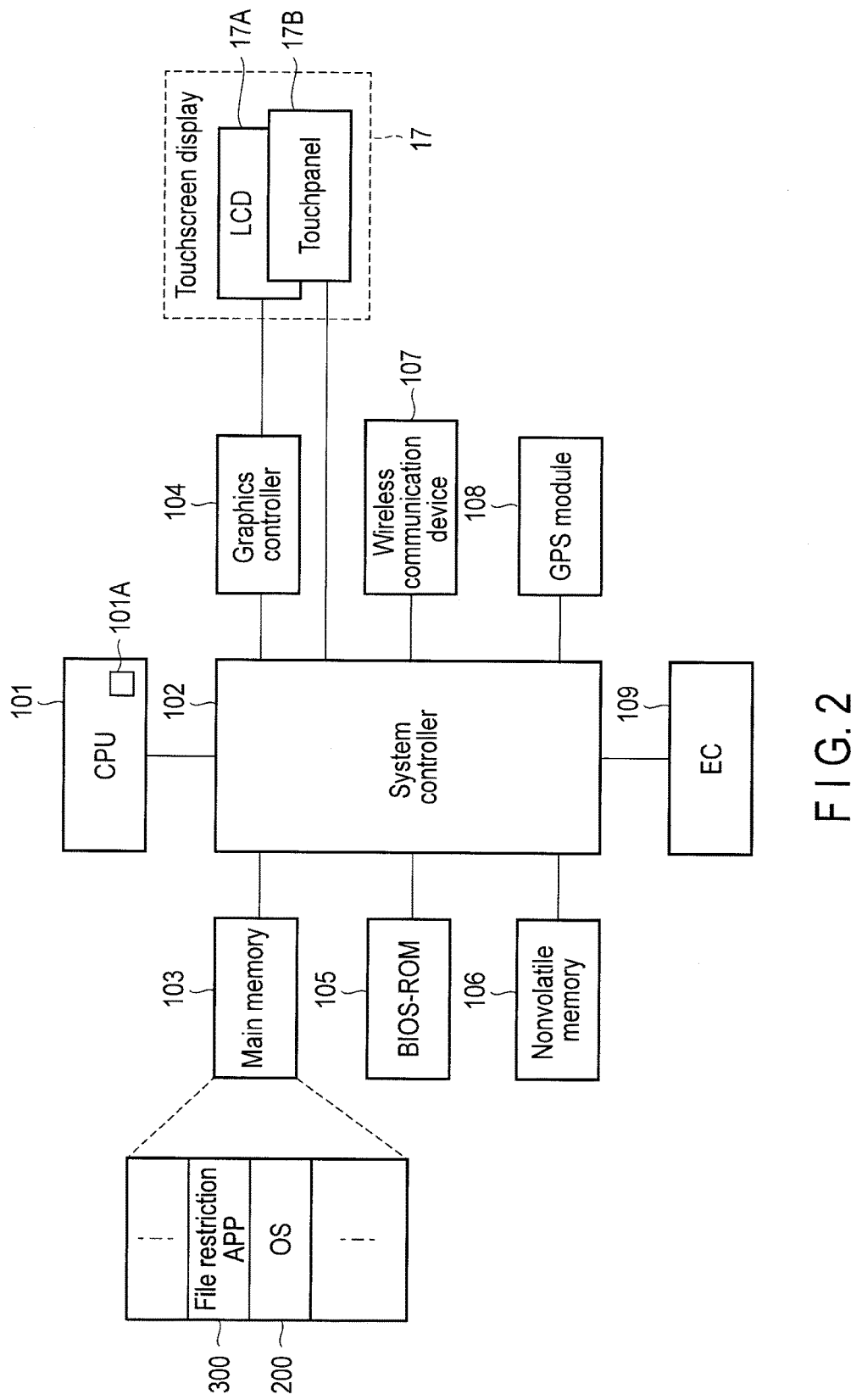
FIG. 2 is a block diagram showing an example of a system configuration of the electronic apparatus.

FIG. 2 is a block diagram showing a system configuration of the computer 10. As shown in FIG. 2, the computer 10 includes the touchscreen display 17, a CPU 101, a system controller 102, a main memory 103, a graphics controller 104, a BIOS-ROM 105, a nonvolatile memory 106, a wireless communication device 107, a GPS module 108, an embedded controller (EC) 109, etc.

The CPU 101 is a processor which controls operation of various modules in the computer 10. The CPU 101 executes various pieces of software loaded from the nonvolatile memory 106, which is a storage device, to the main memory 103, which is a volatile memory. These pieces of software include an operating system (OS) 200 and various application programs. The various application programs include a file restriction application 300. The CPU 101 includes a register 101A in which a value (the number of ticks) added in accordance with a clock is stored.

In addition, the CPU 101 also executes a Basic Input/Output System (BIOS) stored in the BIOS-ROM 105. The BIOS is a program for hardware control.

The system controller 102 is a device which connects a local bus of the CPU 101 and various components. The system controller 102 also contains a memory controller which exerts access control over the main memory 103. In addition, the system controller 102 also has a function of communicating with the graphics controller 104 through a serial bus conforming to the PCI EXPRESS standard, etc.

The graphics controller 104 is a display controller which controls an LCD 17A used as a display monitor of the computer 10. A display signal generated by the graphics controller 104 is transmitted to the LCD 17A. The LCD 17A displays a screen image based on the display signal. A touchpanel 17B is disposed on the LCD 17A. The touchpanel 17B is a capacitive pointing device for performing input on a screen of the LCD 17A. A contact position on the screen which the finger contacts, the movement of the contact position, etc., are detected by the touchpanel 17B.

The wireless communication device 107 is a device configured to perform wireless communication such as wireless LAN or 3G mobile communication. The EC 109 is a single-chip microcomputer including an embedded controller for power management. The EC 109 has a function of powering on or off the computer 10 in accordance with the user's operation of a power button.

The GPS module 108 receives a signal including time information by an atomic clock transmitted from a (global positioning system) satellite, and calculates three-dimensional positional information of a receiving point on the basis of information included in the received signal.

FIG. 3 is a block diagram showing a functional configuration of the file restriction application 300. The file restriction application 300 includes a security policy register 301, a secure time acquisition module 302, a number-of-ticks acquisition module 303, a main controller 304, a time calculator 305, an access controller 306, etc.

The security policy register 301 registers a security policy for a file in a security policy file 311 in the nonvolatile memory 106 on the basis of operation by the user or an administrator. FIG. 4 is a diagram showing an example of a structure of the security policy file 311.

As shown in FIG. 4, the security policy file 311 includes items of a path, a registration time, an available period in a set state (which will be described later) of the computer 10, an available period in a grace period, a process done when an available period is exceeded, a process after the grace period, etc.

The path represents a path of a registered file. The available period in the set state represents a period in which a file is available in the set state from a last reliable terminal time (for example, a time from when a time and date and a file is registered). The process done when the available period is exceeded is a process of restricting access to a resource of the computer when a last reliable terminal time which will be described later does not correspond to the available period in the set state. The process of restricting access to the resource of the computer is, for example, prohibiting access to a file, deleting a file, locking the computer 10, or initializing the computer 10.

The available period in the grace period represents a period in which a file is available (for example, a time from when the time and date or the grace period begins) in the grace period, which will be described later. The process done when the available period is exceeded represents a process done when the available period in the grace period is exceeded. For example, the process is prohibiting access to a file or deleting a file. The process after the grace period represents a process done when a last acquired reliable server time is acquired again. The process is, for example, permitting access to a file or prohibiting access to a file.

The secure time acquisition module 302 attempts to acquire a secure time from a clock server 320, when a file to which access is restricted is stored in the nonvolatile memory 106. The clock server 320 is an external device which can provide reliable time information. Because a third party cannot change time information in the external device, the external device can provide reliable time information. The secure time acquisition module 302 records last acquired reliable server time information 312 indicating a secure time and date (last acquired reliable server time) acquired from the clock server 320 in the nonvolatile memory 106.

When the secure time acquisition module 302 succeeds in acquiring a secure time from the clock server, the number-of-ticks acquisition module 303 acquires the number of ticks stored in the register 101A from the CPU 101.

The time calculator 305 periodically calculates a secure present time and date in the apparatus on the basis of the last acquired reliable server time, the number of ticks at the time the last acquired reliable server time is recorded, and the present number of ticks. The main controller 304 records last reliable terminal time information 313 indicating the calculated secure time and date in the nonvolatile memory 106. It should be noted that the time calculator 305 may calculate the present time and date on the basis of the last reliable terminal time information 313 last recorded in the nonvolatile memory 106, the number of ticks at the time the last reliable terminal time information 313 last recorded in the nonvolatile memory 106 is calculated, and the present number of ticks.

When the secure time acquisition module 302 fails to acquire a secure time from the clock server, the main controller 304 records a value indicating that the computer 10 is in an unset state (which will be described later) in the memory 103 or the nonvolatile memory 106. When the secure time acquisition module 302 succeeds in acquiring a secure time from the clock server, the main controller 304 records a value indicating that the computer 10 is in the set state in the memory 103 or the nonvolatile memory 106.

The set state is a state where a file for which a security policy is registered in the security policy file 311 is stored in the nonvolatile memory 106 and a secure time and date is measured. The unset state is a state where a file for which a security policy is registered in the security policy file 311 is not stored in the nonvolatile memory 106, or a file for which a security policy is registered in the security policy file 311 is stored in the nonvolatile memory 106 and a secure time and date is not measured.

When the apparatus 10 is activated after being shut down and the secure time acquisition module 302 fails to acquire a secure time and date from the clock server 320, the main controller 304 records a value indicating that the computer 10 is in the unset state (not in the set state) in the memory 103 or the nonvolatile memory 106. The main controller 304 records a value indicating being in the grace period in the memory 103 or the nonvolatile memory 106.

The time calculator 305 calculates a time from when the grace period begins. The main controller 304 periodically calculates a grace period time from when the grace period begins on the basis of the number of ticks at the time the grace period begins and the present number of ticks. The time calculator 305 stores grace period time information (GPT) 314 in the nonvolatile memory 106.

When the secure time acquisition module 302 acquires a secure time from the clock server, the main controller 304 records a value indicating being in the set state in the memory 103 or the nonvolatile memory 106. The main controller 304 records a value indicating not being in the grace period in the memory 103 or the nonvolatile memory 106.

The access controller 306 hooks a request for access to a file to the operating system 200. When a request to open a file for which a security policy is registered is hooked, the access controller 306 determines whether or not a value stored in the memory 103 or the nonvolatile memory 106 indicates the set state. When the value stored in the memory 103 or the nonvolatile memory 106 indicates the set state, the access controller 306 determines a process for access to the file on the basis of a last reliable terminal time and the security policy of the file. For example, when the last reliable terminal time corresponds to an available period in the set state, the access controller 306 permits access to the file. In addition, for example, when the last reliable terminal time does not correspond to the available period in the set state, the access controller 306 restricts access to the file.

When a value stored in the register 101A does not indicate the set state, the access controller 306 determines a process for access to the file on the basis of the GPT 314 and the security policy.

It should be noted that the access controller 306 always does not permit access of moving, copying, and removing a file for which a security policy is registered.

Figure 5:
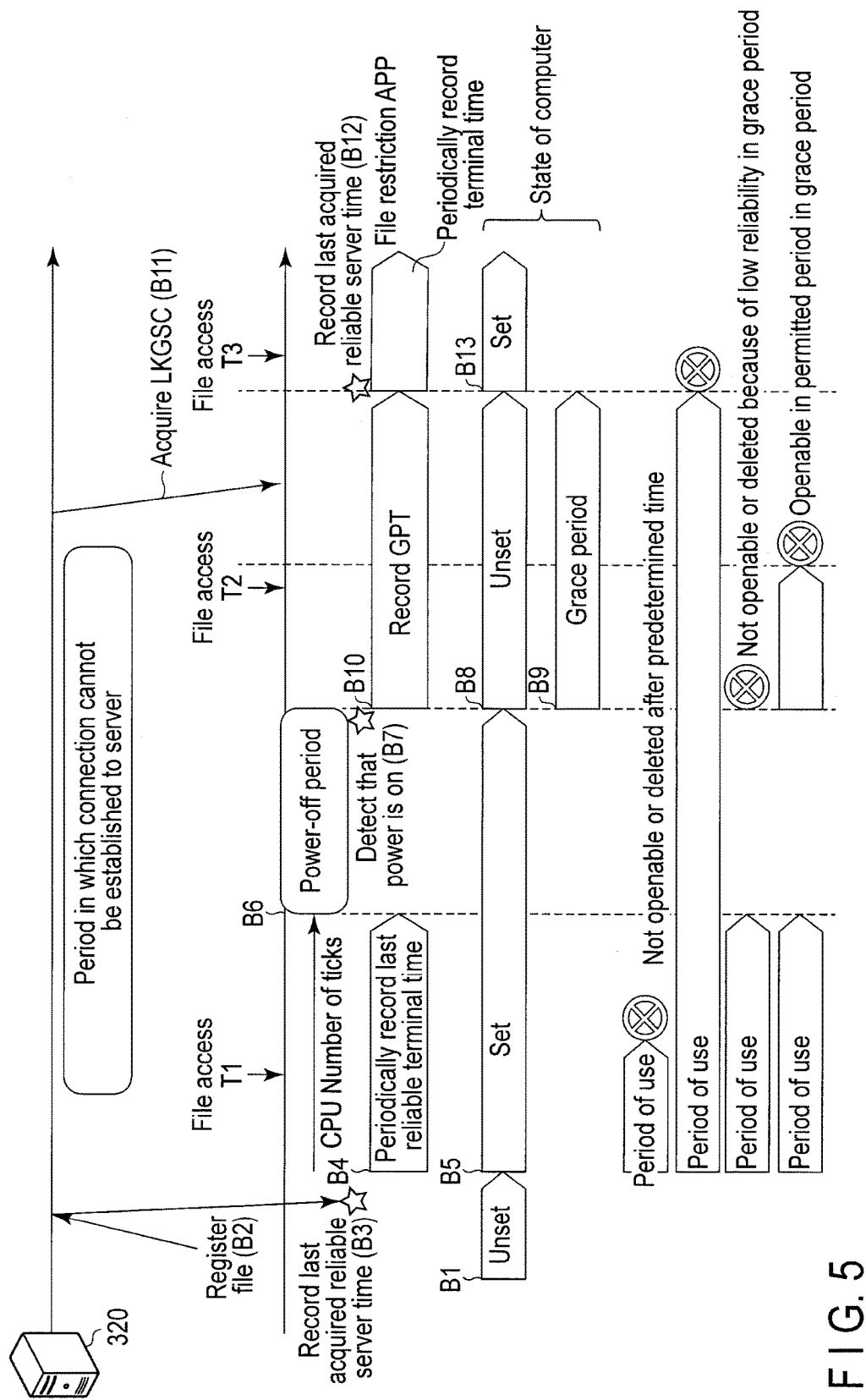
FIG. 5 is a diagram showing an example of a processing procedure according to the file restriction application.

FIG. 5 is a diagram showing a processing procedure according to the file restriction application 300.

When the computer 10 is activated, the main controller 304 records a value indicating being in the unset state in the memory 103 or the nonvolatile memory 106 (block B1). The security policy register 301 registers a security policy for a file in the security policy file 311 on the basis of operation by the user or the administrator (block B2). When the security policy is registered, the secure time acquisition module 302 acquires a secure time (last acquired reliable server time) from the clock server, and records last acquired reliable server time information in the nonvolatile memory 106 (block B3). The time calculator 305 periodically records last reliable terminal time information indicating the present time and date (block B4). The main controller 304 records a value indicating being in the set state in the memory 103 or the nonvolatile memory 106 (block B5). The computer 10 is shut down and powered off (block B6). After the activation, the main controller 304 detects that the power is on (block B7). The main controller 304 records a value indicating being in the unset state in the memory 103 or the nonvolatile memory 106 (block B8). The main controller 304 records a value indicating being in the grace period in the memory 103 or the nonvolatile memory 106 (block B9). When the computer 10 is in the set state when the power is off, the computer 10 is in the unset state and the grace period when the power is on. The time calculator 305 calculates a grace period time (GPT) from when the grace period begins on the basis of the number of ticks at the time the grace period begins and the present number of ticks, and records the calculated GPT in the nonvolatile memory 106 (block B10).

When communication with the clock server 320 is allowed, the secure time acquisition module 302 acquires a new secure time (last acquired reliable server time) from the clock server (block B11). The secure time acquisition module 302 records last acquired reliable server time information indicating the present time and date in the nonvolatile memory 106 (block B12). The main controller 304 records a value indicating being in the set state in the memory 103 or the nonvolatile memory 106 (block B13).

The access controller 306 determines access to files A to D in accordance with a security policy. When the files A to D are accessed at a time T1 in the set state, the access controller 306 permits access to the files A to D. When the file A or the file C is accessed at a time T2 in the grace period, opening the file A or the file C is prohibited, or the file A or the file C is deleted. It should be noted that the access controller 306 may delete the file C at a point in time when a value indicating being in the unset state is recorded while the power is on. When the file B or the file D is accessed at the time T2, the access controller 306 prohibits opening the file B or the file D, or deletes the file B or the file D. When the files A to D are accessed at a time T3 in the set state after the grace period, the access controller 306 prohibits opening the files A to D or deletes the files A to D.

FIG. 6 is a flowchart showing a processing procedure of the access controller 306 when a file is accessed.

The access controller 306 hooks a request for access to a file to the operating system 200 (block B21). It is determined whether or not a security policy for a target file to be accessed is registered in the security policy file 311 (block B22). When it is determined that the security policy for the target file is not registered in the security policy file 311 (No in block B22), the access controller 306 permits access, and passes the hooked access request to the operating system 200 (block B23).

When it is determined that the security policy for the target file is registered in the security policy file 311 (Yes in block B22), the access controller 306 determines whether or not the access request is to open the file (block B24).

When it is determined that the access request is not to open the file (No in block B24), the access controller 306 prohibits access to the file, and does not pass the hooked access request to the operating system 200 (block B25).

When it is determined that the access request is to open the file (Yes in block B24), the access controller 306 determines whether or not a value indicating being in the set state is stored in the memory 103 or the nonvolatile memory 106 (block B26). When it is determined that the value indicating being in the set state is stored (Yes in block B26), the access controller 306 determines whether or not a last reliable terminal time is within an available period in the set state (block B27).

When it is determined that the last reliable terminal time is within the available period (Yes in block B27), the access controller 306 permits opening the file, and passes the hooked access request to the operating system 200 (block B28). When it is determined that the last reliable terminal time is not within the available period (No in block B27), the access controller 306 prohibits access to the file, and carries out a process done when the available period is exceeded which is described in the security policy (block B29).

When it is determined that the value indicating being in the set state is not stored (No in block B26), the access controller 306 determines whether or not the last reliable terminal time is within an available period in the grace period (block B30).

When it is determined that the last reliable terminal time is within the available period (Yes in block B30), the access controller 306 permits opening the file, and passes the hooked access request to the operating system 200 (block B31). When it is determined that the last reliable terminal time is not within the available period (No in block B30), the access controller 306 prohibits access to the file, and carries out a process done when the available period is exceeded which is described in the security policy (block B32).

It should be noted that the computer 10, which could not connect to a designated clock server for a predetermined period, may be initialized at the time of shipping or may be locked to disable logging in, instead of restricting access to a designated file. In this case, last reliable terminal time information is reset whenever a time is acquired from the clock server, and a device is initialized into a state at the time of shipping when it cannot connect to the clock server for a predetermined period and an available period is exceeded.

When the following processes are carried out, a file which is not openable because of the expiration of a period may be made openable again, or logging into a locked terminal again may be permitted:

1. A last acquired reliable server time is acquired again from the clock server (because connection is made from a corporate LAN, it is determined that the terminal has returned to an office)

2. A release instruction is received from the clock server (administrative server) (an IT administrator and a senior staff member give permission).

3. The terminal is connected to an access point of a corporate wireless LAN, or it is confirmed by positional information calculated by the GPS module 108 that the terminal is in the office (a resident service in the computer itself determines that the terminal has returned to a safety place from the state of the terminal).

In addition, at the time of expiration of a period, a notification dialog may be displayed to the user so that the user can apply for extension of the period. In this case, when the user's request for extension is transmitted to the administrative server, and when the administrative server permits, the period of use of a file is extended.

To obtain time information from the clock server 320, it is necessary to connect to the Internet. Thus, present time information included in a signal received by the GPS module 108 can also be adopted as a reliable time and date (last acquired reliable server time).

As well as the time by GPS, standard waves used in an atomic clock, etc., a time signal of a radio, and time information included in a control signal from a cellular phone base station may be used.

Acquisition from a reliable time information source and the above-described server may also be attempted.

When an available period is set according to an elapsed time, the following points in time may be used as a starting point of the elapsed time:

a. point in time when the administrative server (clock server) designates b. point in time the user voluntarily designates in the terminal c. point in time when the terminal is outside a corporate backbone LAN for a predetermined period d. point in time when a position of the terminal based on positional information received by the GPS module 108 is not in a designated area Thus, the available period is not set on the day when the terminal is carried out, but the setting can be already completed when the terminal is used in the office.

Although in the above-described embodiment, an elapsed time is recorded with respect to a time acquired from the clock server, a file can also be deleted when a predetermined time has passed since a reference time when the file was registered. In this case, because of low reliability in the grace period after the power is off, the file may be automatically deleted.

According to the above-described embodiment, time and date information indicating the present time and date is acquired from an external device such as the clock server 320, time information indicating a time from when the time and date information is acquired to the present is calculated on the basis of the time and date information and the above-described value, and when the time information exceeds an available period, access to the file is prohibited or the file is deleted. A highly confidential file can thereby be prevented from being used.

Because various processes of the present embodiment can be implemented by a computer program, the same advantages as those of the present embodiment can be easily achieved simply by installing the computer program into a computer through a computer-readable storage medium storing the computer program and executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:

a processor configured to operate based on a clock and to execute various applications including a file restriction application; and a nonvolatile memory in which a security policy and a file to which access is restricted in accordance with the security policy are stored, wherein the processor is configured to:

record that the electronic apparatus is in a first state, when the file to which access is restricted is stored in the nonvolatile memory and a secure time is periodically acquirable from an external device;

restrict access to the file in accordance with the security policy, if it is determined that the time when it is recorded that the electronic apparatus is in the first state is not during an available period of the first state when the electronic apparatus receives an access request to open the file;

record that the electronic apparatus is in a second state, when the file to which access is restricted is stored in the nonvolatile memory and the secure time is not acquirable from the external device; and restrict access to the file in accordance with the security policy, if the electronic apparatus is in the second state when the electronic apparatus is restarted after being shut down and receives the access request to open the file, and if it is determined that a grace period is not during an available period of the grace period, the grace period being a period from when the electronic apparatus is set to power-on from power-off.

2. The electronic apparatus of claim 1, wherein the processor is configured to:

permit opening the file, if it is determined that the time when it is recorded that the electronic apparatus is in the first state is during the available period of the first state when the electronic apparatus receives the access request to open the file; and permit opening the file, if the electronic apparatus is in the second state when the electronic apparatus is restarted after being shut down and receives the access request to open the file, and if it is determined that the grace period is during the available period of the grace period.

3. The electronic apparatus of claim 1, wherein the processor comprises a register in which an accumulated value accumulated in accordance with the clock is stored, and is configured to calculate the available period in the grace period, based on a first accumulated value indicated by the register when the grace period begins and a second accumulated value presently indicated by the register.

4. The electronic apparatus of claim 1, wherein the processor is configured to acquire a new secure time and store the new secure time in the nonvolatile memory when communication with the external device is allowed.

5. A control method of an electronic apparatus comprising a processor which is configured to operate based on a clock and to execute various applications including a file restriction application, and a nonvolatile memory in which a security policy and a file to which access is restricted in accordance with the security policy are stored, the method comprising:

recording that the electronic apparatus is in a first state, when the file to which access is restricted is stored in the nonvolatile memory and a secure time is periodically acquirable from an external device;

restricting access to the file in accordance with the security policy, if it is determined that the time when it is recorded that the electronic apparatus is in the first state is not during an available period of the first state when the electronic apparatus receives an access request to open the file;

recording that the electronic apparatus is in a second state, when the file to which access is restricted is stored in the nonvolatile memory and the secure time is not acquirable from the external device; and restricting access to the file in accordance with the security policy, if the electronic apparatus is in the second state when the electronic apparatus is restarted after being shut down and receives the access request to open the file, and if it is determined that a grace period is not during an available period of the grace period, the grace period being a period from when the electronic apparatus is set to power-on from power-off.

6. The control method of claim 5, comprising:

permitting opening the file, if it is determined that the time when it is recorded that the electronic apparatus is in the first state is during the available period of the first state when the electronic apparatus receives the access request to open the file; and permitting opening the file, if the electronic apparatus is in the second state when the electronic apparatus is restarted after being shut down and receives the access request to open the file, and if it is determined that the grace period is during the available period of the grace period.

7. A non-transitory computer-readable storage medium having stored thereon a computer program which is executable by a computer which comprises a processor which is configured to operate based on a clock and to execute various applications including a file restriction application, and a nonvolatile memory in which a security policy and a file to which access is restricted in accordance with the security policy are stored, the computer program comprising instructions capable of causing the computer to execute functions of:

recording that the electronic apparatus is in a first state, when the file to which access is restricted is stored in the nonvolatile memory and a secure time is periodically acquirable from an external device;

restricting access to the file in accordance with the security policy, if it is determined that the time when it is recorded that the electronic apparatus is in the first state is not during an available period of the first state when the electronic apparatus receives an access request to open the file;

recording that the electronic apparatus is in a second state, when the file to which access is restricted is stored in the nonvolatile memory and the secure time is not acquirable from the external device; and restricting access to the file in accordance with the security policy, if the electronic apparatus is in the second state when the electronic apparatus is restarted after being shut down and receives the access request to open the file, and if it is determined that a grace period is not during an available period in the grace period, the grace period being a period from when the electronic apparatus is set to power-on from power-off.

8. The non-transitory computer-readable medium of claim 7, wherein the computer program comprises instructions capable of causing the computer to execute functions of:

permitting opening the file, if it is determined that the time when it is recorded that the electronic apparatus is in the first state is during the available period of the first state when the electronic apparatus receives the access request to open the file; and permitting opening the file, if the electronic apparatus is in the second state when the electronic apparatus is restarted after being shut down and receives the access request to open the file, and if it is determined that the grace period is during the available period of the grace period.

* * * * *